(12) United States Patent
Dotsch et al.

(10) Patent No.: US 10,302,479 B2
(45) Date of Patent: May 28, 2019

(54) SYSTEM FOR DETERMINING AND/OR MONITORING A PROCESS VARIABLE OF A MEDIUM

(71) Applicant: Endress + Hauser GmbH + Co. KG, Maulburg (DE)

(72) Inventors: Michael Dotsch, Rickenbach (DE); Franco Ferraro, Schopfheim (DE); Philipp Walser, Lorrach (DE); Andreas Krumbholz, Maulburg (DE); Robert Schmidt, Schopfheim (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 95 days.

(21) Appl. No.: 15/103,004

(22) PCT Filed: Nov. 14, 2014

(86) PCT No.: PCT/EP2014/074611
§ 371 (c)(1),
(2) Date: Jun. 9, 2016

(87) PCT Pub. No.: WO2015/086256
PCT Pub. Date: Jun. 18, 2015

(65) Prior Publication Data
US 2016/0305813 A1    Oct. 20, 2016

(30) Foreign Application Priority Data
Dec. 13, 2013 (DE) .......................... 10 2013 114 045

(51) Int. Cl.
*G01F 23/00*    (2006.01)
*G01F 23/296*    (2006.01)

(52) U.S. Cl.
CPC .......... *G01F 23/2966* (2013.01); *G01F 23/00* (2013.01); *G01F 23/2967* (2013.01); *G01F 23/2968* (2013.01)

(58) Field of Classification Search
CPC .. G01F 23/00; G01F 23/2966; G01F 23/2967; G01F 23/2968
See application file for complete search history.

(56) References Cited

U.S. PATENT DOCUMENTS

| 3,625,058 A | 12/1971 | Dress |
| 3,745,384 A | 7/1973 | Blanchard |

(Continued)

FOREIGN PATENT DOCUMENTS

| CN | 1411551 A | 4/2003 |
| CN | 1423582 A | 6/2003 |

(Continued)

OTHER PUBLICATIONS

German Search Report, German Patent Office, Munich, DE, dated Sep. 9, 2014.

(Continued)

*Primary Examiner* — David Z Huang
(74) *Attorney, Agent, or Firm* — Bacon & Thomas, PLLC

(57) ABSTRACT

A system for determining and/or monitoring a process variable of a medium in a container, comprising a sensor module with an oscillatable unit, which is arranged in such a manner in the container that the oscillatable unit extends to a defined immersion depth in the medium, or that the oscillatable unit is placed at the height of the predetermined fill level, a tubular extension and/or a temperature reduction unit of a defined length, a contacting module and an electronics module, composed of an exciter/receiving unit, which excites the oscillatable unit to execute oscillations and receives the oscillations of the oscillatable unit. Two elec- (Continued)

trical coupling paths are associated with the electronics module, and a control/evaluation unit, which based on at least one oscillation variable of the oscillations or based on a change of an oscillation variable of the oscillations, provides information concerning the process variable or the reaching of the predetermined fill level. The sensor module and the electronics module are either electrically connected directly with one another, wherein one of the two electrical coupling paths is activated, or wherein the sensor module and the electronics module are indirectly electrically connected with one another via the contacting module, and wherein both coupling paths are activated.

15 Claims, 4 Drawing Sheets

(56) References Cited

U.S. PATENT DOCUMENTS

| | | | |
|---|---|---|---|
| 4,594,891 A | 6/1986 | Benz | |
| 4,740,726 A * | 4/1988 | Umezawa | G01F 23/2967 310/23 |
| 5,709,558 A | 1/1998 | Dreyer | |
| 6,236,322 B1 | 5/2001 | Lopatin et al. | |
| 6,429,571 B2 | 8/2002 | Raffalt | |
| 7,723,898 B2 | 5/2010 | Wohrle | |
| 2002/0167413 A1 | 11/2002 | Kelly | |
| 2015/0075279 A1 | 3/2015 | Donzier | |

FOREIGN PATENT DOCUMENTS

| | | |
|---|---|---|
| CN | 1751230 A | 3/2006 |
| CN | 1846335 A | 10/2006 |
| DE | 2631061 | 1/1977 |
| DE | 3734077 A1 | 4/1989 |
| DE | 10023306 A1 | 6/2001 |
| DE | 102005036872 A1 | 2/2007 |
| DE | 102007038022 A1 | 2/2009 |
| DE | 202013103798 U1 | 10/2013 |
| EP | 0766072 A1 | 2/1997 |
| EP | 2650668 A1 | 10/2013 |
| WO | 03054492 A1 | 7/2003 |
| WO | 2004057283 A1 | 7/2004 |
| WO | 2004075417 A2 | 9/2004 |

OTHER PUBLICATIONS

International Search Report, EPO, The Netherlands, dated Jan. 26, 2015.
English Translation of the International Preliminary Report on Patentability, WIPO, Geneva, CH, dated Jun. 23, 2016.

* cited by examiner

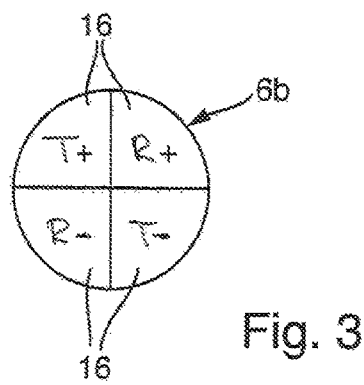
Fig. 3
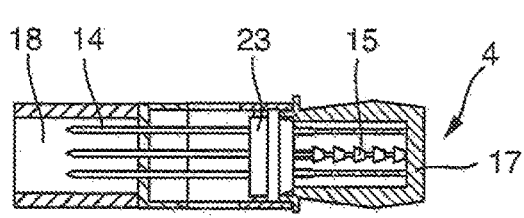
Fig. 4a
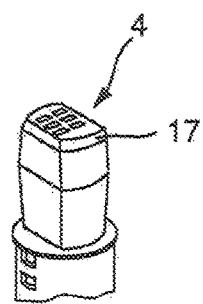
Fig. 4b
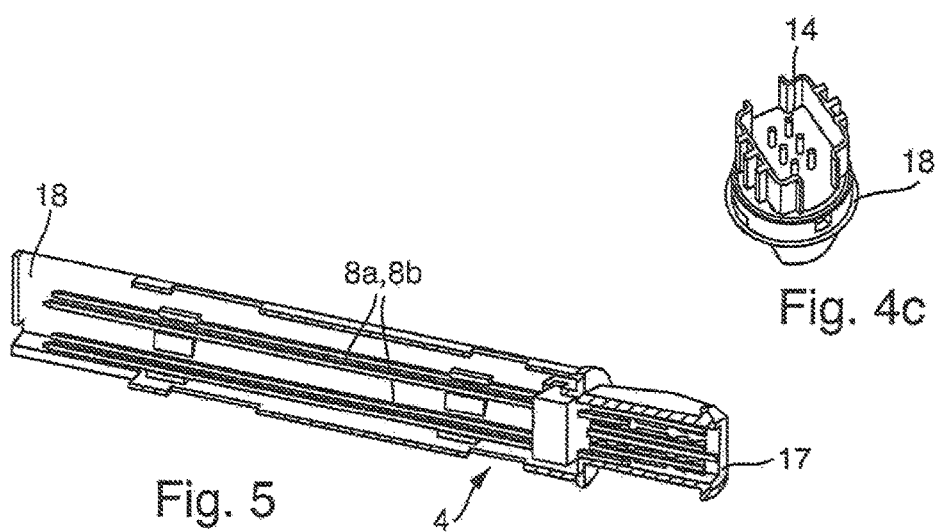
Fig. 4c
Fig. 5

SYSTEM FOR DETERMINING AND/OR MONITORING A PROCESS VARIABLE OF A MEDIUM

TECHNICAL FIELD

The invention relates to a system for determining and/or monitoring a process variable of a medium or for determining and/or monitoring a predetermined fill level of a medium in a container.

BACKGROUND DISCUSSION

Sensors for determining and monitoring the limit level of liquid media and flowable solids are sold by the applicant under the marks LIQUIPHANT and SOLIPHANT. Process variables, which besides fill level (limit level detection) can be monitored with vibronic sensors, include especially the process variables, density and viscosity. The applicant sells a sensor suitable for density measurement under the designation, LIQUIPHANT density. Moreover, the applicant is owner of a large number of industrial property rights relating to vibronic sensors for limit-level-, density- and/or viscosity measurement.

Used for driving vibronic sensors is either a piezoelectric bimorph drive or a piezoelectric stack drive. In the case of a bimorph drive, a disc shaped piezoelectric element is connected by force interlocking, e.g. frictional interlocking, with a membrane, to which the oscillatable unit is secured. The disc-shaped element is differently polarized in different segments. In the case of a stack drive, a number of piezoelectric elements are arranged e.g. on a bolt connected among one another and with the oscillatable unit by force interlocking, e.g. frictional interlocking, wherein some piezoelectric elements are excited by an electrical alternating signal to execute oscillations, while the remaining piezoelectric elements register the oscillations of the oscillatable unit and convert such into an alternating electrical response signal.

The oscillatable unit of a vibronic measuring device includes, protruding into the container, preferably two oscillatory rods, which are secured on the outer surface of a membrane facing the medium. Known, however, are also vibronic measuring devices having a single rod. The piezoelectric elements serving as exciter unit are supplied with an alternating voltage signal, whereby the two oscillatory rods of the oscillatable unit are excited to oppositely sensed oscillations directed transversely to the longitudinal axis of the vibronic measuring device. The receiving unit receives the oscillations of the mechanical oscillatable unit and transduces such into an electrical alternating voltage signal. If a change in the oscillation variables appears, e.g. if a frequency change occurs in the oscillations of the oscillatable unit, then this is cause for a corresponding report of the vibronic fill-level measuring device. In the case of application as an overfilling preventer, possible reports include: "Oscillatable unit in contact with the medium", respectively "limit-level achieved" or "oscillatable unit oscillating freely", respectively "limit-level not achieved". For density- and/or viscosity measurement, likewise the alternating voltage response signal is suitably evaluated.

Vibronic measuring devices are sold by Endress+Hauser either in a compact version or in versions with a tube extension and/or a temperature reduction unit. For example, the compact version is so designed that it can be applied at temperatures up to e.g. 100° C. In the case of the compact version, the sensor module—composed of the oscillatable unit and the mechanical, respectively electromechanical, part of the exciter/receiving unit—is connected via a mechanical and electrical/electronic interface directly with the electronics module—i.e. the electrical/electronic part of the exciter/receiving unit and the evaluation unit. In order at temperatures above 100° C. to prevent a degrading or destruction of temperature-sensitive components of the electronics module, a temperature reduction unit is arranged between the sensor module and the electronics module. In such case, the length of the temperature reduction unit depends on the ambient temperature reigning at the location of use of the vibronic measuring device. A tubular extension likewise increases the distance between the sensor module and the electronics module. Moreover, the tubular extension has the job of changing the position of the switching point of the vibronic measuring device in the container. In order that the vibronic measuring device has a comparable behavior in an equal application independently of its length, it is necessary to construct the electronics module differently as a function of the length of the vibronic sensor: resulting from the lengthened electrical lines are coupling capacitances, which superimpose on the alternating voltage signals and influence the behavior of the vibronic measuring device.

An object of the invention is to provide a universally applicable, cost effective, vibronic measuring device.

SUMMARY OF THE INVENTION

The object is achieved by a system for determining and/or monitoring a process variable of a medium or for determining and/or monitoring a predetermined fill level of a medium in a container, comprising a sensor module with an oscillatable unit, which is arranged in such a manner in the container that the oscillatable unit extends to a defined immersion depth in the medium, or that the oscillatable unit is placed at the height of the predetermined fill level, a tubular extension and/or a temperature reduction unit of a defined length, a contacting module and an electronics module, composed of an exciter/receiving unit, which excites the oscillatable unit to execute oscillations and receives oscillations of the oscillatable unit, wherein two electrical coupling paths are associated with the electronics module, and a control/evaluation unit, which based on at least one oscillation variable of the oscillations or based on a change of an oscillation variable of the oscillations, provides information concerning the process variable or the reaching of the predetermined fill level, wherein the sensor module and the electronics module are either electrically connected directly with one another and wherein one of the two electrical coupling paths is activated, or wherein the sensor module and the electronics module are indirectly electrically connected with one another via the contacting module and wherein both coupling paths are activated.

As a function of the temperature reigning at the location of use of the vibronic measuring device and/or as a function of the switching point of the vibronic measuring device, the sensor module and the electronics module are either directly connected with one another (compact version) or a contacting module is arranged between the sensor module and the electronics module (elongated version(s)). Via the temperature reduction unit, the electronics module is situated farther from the process connection and therewith from the process. In this way, a temperature reduction in the region of the electronics module is achieved. The switching point of a vibronic measuring device lies in the region of the oscillatory rods of the oscillatable unit. Via the tubular extension, the switching point can be shifted in height relative to the container.

The length of the contacting module depends on the mechanical construction of the vibronic measuring device. Thus, the tubular extension can be provided between the sensor module and a process connection, via which the measuring device is mounted in a container wall, and/or, when required, a temperature reduction unit, especially a temperature reducing tube, is provided between the process connection and the electronics unit. In the case of the compact version, the connection between sensor module and electronics module occurs directly—thus without the appropriately dimensioned contacting module and without the tubular extension and/or the temperature reducing tube. Since, in this case, the coupling capacitances on the electrical paths are small, according to the invention, only one of the two coupling paths provided in the electronics unit is activated.

If, in contrast, the elongated version of the vibronic measuring device with tubular extension and/or temperature reducing tube and with correspondingly adapted contacting module is used, then both coupling paths in the electronics unit are activated, in order to eliminate the coupling capacitances arising on the electrical paths.

An advantage of the solution of the invention is that no additional electronic variants and/or no additional sensor module variants are required. The sensor module and the electronics module are always equally embodied, independently of whether a contacting module is used and which dimensioning the contacting module has. For manufacturing, this is naturally a significant advantage compared with the known solutions, in the case of which at least the electronics module had to be changed as a function of the distance between sensor module and electronics module.

Furthermore, the modular concept is so designed that the individual modules can be connected together with one another in simple manner by plugging. In this way, the final assembly is significantly simplified. Moreover, the two interfaces in the end regions of the contacting module are differently embodied, whereby an incorrect assembly of the individual modules is excluded. Also, the interfaces are embodied in such a manner that the relative height positions of the individual modules in the case of assembly are exactly defined.

Furthermore, the contact sockets are preferably embodied as spring contacts, while the contact pins are rigidly embodied. The resilient, force interlocking connection of spring contacts and contact pins means that no additional mechanical loads are transmitted to the connecting regions. Especially, the rigid contact pins can freely orient between the spring contacts. One speaks in this connection also of a floating seating of the contact pins. Since the contact pins are rigidly embodied, undesired parasitic effects are prevented. Disturbing parasitic effects occur especially in the case of flexible connecting lines, since parasitic effects are generally dependent on the positions of the connecting lines.

In order to fulfill the requirements for temperature resistance, the contacting module is composed of a synthetic material, which is designed for the maximum temperature reigning at the location of use. The spring contacts and the contact pins are manufactured of a temperature-resistant metal. In the connecting regions, they are preferably gold coated.

In the case of a disassembly, it is important that the complete contacting module be pulled out from the tubular housing of the vibronic measuring device. Therefore, the contacting module in an advantageous further development is so embodied that the interface lying nearer to the freely accessible end region of the contacting module has a greater plugging force than that of the interface, which should loosen and which is provided on the opposing end region of the contacting module.

In an advantageous embodiment of the system of the invention, the electronics module is so embodied that coupling capacitances, which occur in the case of application of a contacting module due to the lengthened electrical paths, are at least approximately compensated. Since coupling capacitances occurring in the case of the lengthened versions of the vibronic measuring device according to the invention are for the most part eliminated, the behavior of the vibronic measuring device is—independently of its length—at least approximately equal in identical applications.

In an advantageous further development of the system of the invention, at least four contact pins and at least four corresponding contact sockets are provided, in each case, for connection of sensor module and electronics module or for connection of sensor module and contacting module and contacting module and electronics module. Especially advantageous are six or more contact pins and contact sockets, wherein, in each case, at least two contact pins and contact sockets form a ground path, while the remaining contact pins and contact sockets form two electrical paths.

In the case of application as a compact version—thus in the case of direct connection of sensor module and electronics module—the contact pins and contact sockets of sensor module and electronics module are so designed that one of the two coupling paths is connected to ground and, consequently, deactivated.

In contrast, the contact pins and contact sockets for connection of sensor module and contacting module, respectively for connection of contacting module and electronics module are so designed in the case of application of the version with tubular extension that both electrical coupling paths are activated.

In an advantageous embodiment of the system of the invention, used as exciter/receiving unit is a disc shaped piezoelectric element with four segments of equal dimension, wherein two segments have one polarization, e.g. +, and two segments have an opposite polarization, e.g. −. This is, thus, a bimorph drive with four segments. Suitable bimorph drives are described at length in European Patents, EP 1 281 051 B1 and EP 1 759 175 A2.

Moreover, in an embodiment of the above described bimorph drive, excitation is such that, in each case, one coupling path connects, respectively couples, the polarized segments with one another and one coupling path connects, respectively couples, the oppositely polarized segments with one another.

Especially advantageous in connection with the solution of the invention is when there are placed in the electrical coupling paths capacitors, which are so designed that they at least partially, preferably, however, completely, compensate coupling capacitances arising in the lengthened electrical paths. Preferably, the capacitors are arranged in the electronics module.

As already earlier stated, it is especially advantageous when the sensor module and the electronics module in the case of direct connection of sensor module and electronics module and in the case of insertion of the contacting module are embodied identically. If such an embodiment is present, then the multiplicity of variants is minimal. The system of the invention, respectively the kit of the invention, permits, consequently, a very cost effective manufacturing of vibronic measuring devices for the most varied of applications.

BRIEF DESCRIPTION OF THE DRAWINGS

The invention will now be explained in greater detail based on the appended drawing, the figures of which show as follows:

FIG. 3 is a plan view of a piezoelectric element in the case of a bimorph drive;

FIG. 4a is a longitudinal section of a first short variant of the contacting module;

FIG. 4b is a perspective view of the electronics module facing interface of the contacting module of FIG. 4a;

FIG. 4c is a perspective view of the sensor module facing interface of the contacting module of FIG. 4a;

FIG. 5 is a longitudinal section of an elongated variant of the contacting module;

DETAILED DISCUSSION IN CONJUNCTION WITH THE DRAWINGS

Figure 1:
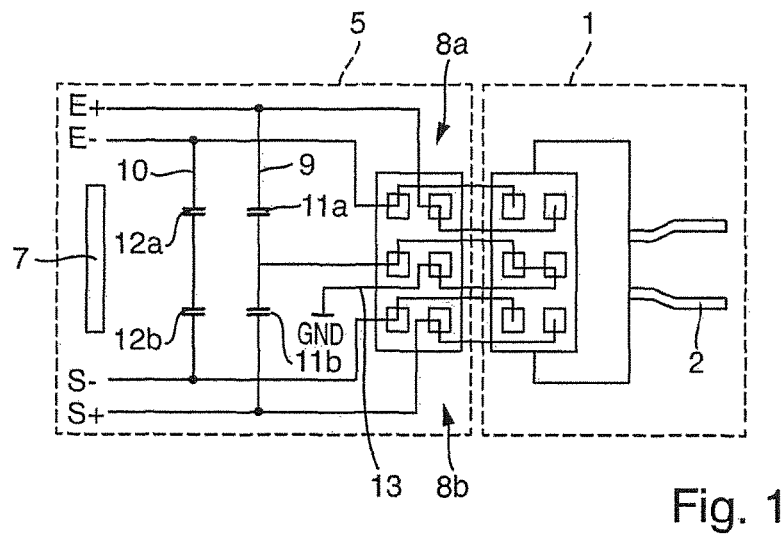
FIG. 1 is a block diagram of the system of the invention in the compact version.

FIG. 1 shows a block diagram of an advantageous embodiment used in the case of the system of the invention embodied in a compact version. In the case of the compact version, the sensor module 1 and the electronics module 5 are directly connected with one another. The two coupling paths 9, 10 are in the one electronics module 5. Each coupling path 9, 10 has two capacitors 11a, 11b, 12a, 12b connected in series. In the case of the compact version, only one of the two coupling paths 9, 10—here the coupling path 10—is activated. The coupling path 9 is connected to ground GND and is, thus, deactivated.

Figure 2:
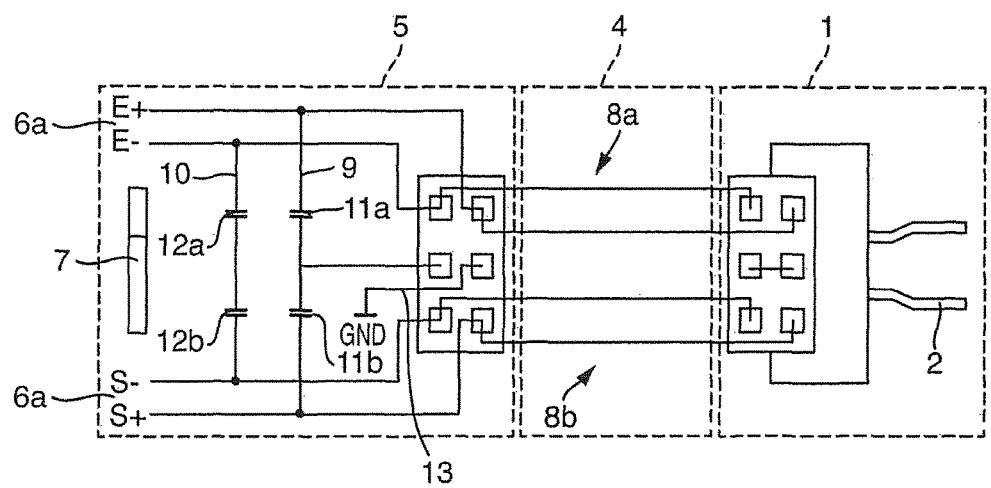
FIG. 2 is a block diagram of the system of the invention in the elongated version.

FIG. 2 shows a block diagram of an advantageous embodiment of the system of the invention in one of the lengthened versions, in which case a contacting module 4 is used between the sensor module 1 and the electronics module 5. In the case of the lengthened versions, both coupling paths 9, 10 are activated.

In the case of the lengthened version, the sensor module 1 and the electronics module 5 are connected with one another indirectly via two electrical paths 8a, 8b elongated as a result of the contacting module 4. The middle path is the ground path 13.

Figure 8:
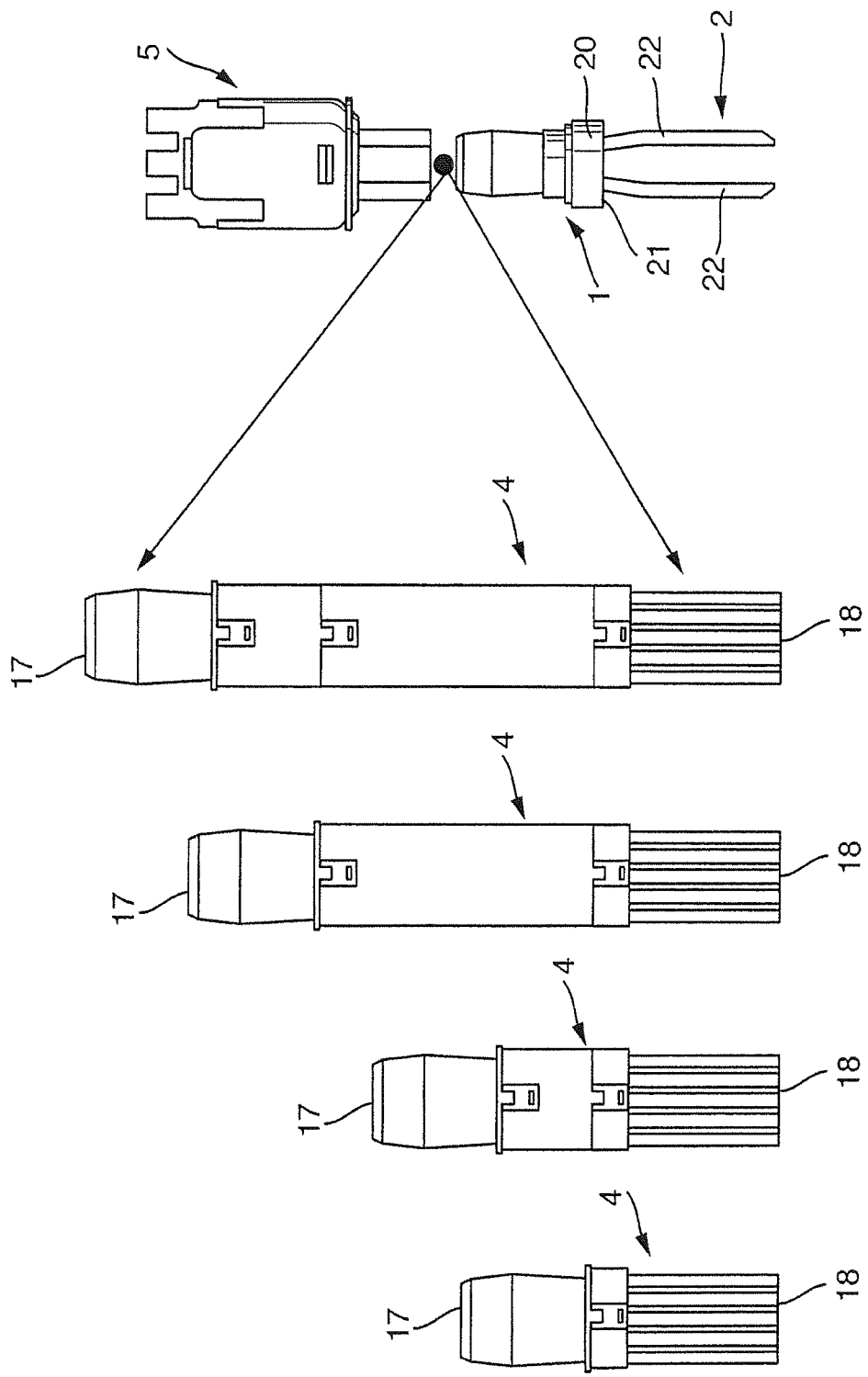
FIG. 8 is a preferred form of embodiment of the system of the invention, in five different versions.

Based on FIGS. 4, 5 and 8, it is evident that the sensor module facing interface 18 of the contacting module 4 is embodied analogously to the interface of the electronics module 5, and the electronics module facing interface 17 is embodied identically to the interface of the sensor module 1. Through simple plugging together of the modules 1, 5, respectively 1, 4, 5, depending on need, the compact version or the elongated version of the vibronic measuring device can be formed from the individual components.

After reaching a defined length of the lengthened versions of the vibronic measuring device, both coupling paths 9, 10 are activated, in order to remove coupling capacitances occurring on the lengthened paths 8a, 8b. While in the case of the compact version and, in given cases, in the case of application of a short version of the contacting module 4, three electrical paths 8a, 8b, 13 with six contactings 14, 15 are provided, the elongated version has only two electrically elongated paths 8a, 8b. The capacitors 11a, 11b, 12a, 12b located in the coupling paths 9, 10 are so selected that coupling capacitances, which occur due to the lengthened electrical paths 8a, 8b, are at least approximately compensated.

The sensor module 1 and the electronics module 5 are in the case of all versions of the vibronic measuring device (see especially FIG. 8) equally embodied. Therewith, it is possible, as a function of application and conditions at the location of use of the measuring device, to select a contacting module 4 of suitable length. The length of the contacting module 4 depends on whether a tubular extension 24 and/or a temperature reducing tube 3b are/is used. Since application of the tubular extension 24 and/or the temperature reduction unit 3b changes the separation of the electronics module 5 from the process, the vibronic measuring device can also be used in high temperature applications. Via the tubular extension 24, moreover, the switching point of the vibronic measuring device can be shifted.

The sensor module 1 is composed of a tubular neck region 20, which is sealed in an end region by a membrane 21. Secured on the membrane 21 is the oscillatable unit 2, which in the shown case is composed of two rods, or tines, 22. Of course, instead of the oscillatory fork, also a single rod can be used.

During operation, the measuring device is arranged on the container via the process connection 19 in such a manner that the oscillatable unit 2 extends to a defined immersion depth in the medium and ascertains measured values regarding the density or viscosity of the medium, or such that the oscillatable unit 2 is located at the height of the predetermined fill level and at least temporarily comes in contact with the medium. As already mentioned, the switching point of the vibronic measuring device can be varied via the tubular extension 24.

The oscillatable unit 2 is excited via an exciter/receiving unit 6a, 6b and an alternating voltage signal from the control/evaluation unit 7, such that the oscillatable unit 2 is caused to oscillate. The response oscillation is provided by at least one piezoelectric element 6b, and the corresponding response signal is evaluated by the control/evaluation unit 7. Information concerning the process variable or the reaching of the predetermined fill level is provided based on at least one oscillation variable of the oscillation or based on a change of an oscillation variable of the oscillation.

FIG. 3 shows a preferred embodiment of an exciter/receiving unit in the form of a disc shaped piezoelectric element 6b, which has four segments 16. Two segments 16 have a polarization (+), and two segments 16 have an opposite polarization (−). The transmission signal T−, T+ is—such as shown in FIG. 3—applied to two segments 16 of the piezoelectric element 6b. The received signal R−, R+ is tapped on the two remaining segments. A corresponding drive is already utilized in products of the applicant and is referred to as a bimorph drive. Known embodiments of bimorph drives are described in EP 1 281 051 B1 and EP 1 759 175 A2. Of course, the solution of the invention is not limited to the segmenting of the piezoelectric element 6b shown in FIG. 3.

For connection of the contacting module 4 with the sensor module 1 and the electronics module 5 in the case of the illustrated embodiment of the apparatus of the invention, in each case, six contact pins 14 and, in each case, six corresponding contact sockets 15 are provided. This embodiment is also illustrated in FIGS. 4a, 4b and 5. In the case of the compact version illustrated in FIG. 1, the sensor module 1 is plugged directly to the electronics module 5. The center junction of the coupling path 9 is connected to ground via the centrally arranged electrical contacts 14, 15 and the shunt in the sensor module 1. Thus, in the case of the compact version, one of the two coupling paths—here the coupling path 9—is not active.

In the case of the direct connection of sensor module 1 and electronics module 5, the contact pins 14 and contact sockets 15 of sensor module 1 and electronics module 5 are, thus, so designed that one of the two coupling paths 9, 10 is connected to ground and deactivated.

In the case of application of an appropriately long contacting module 4, the contact pins 14 and the contact sockets 15 for connection of sensor module 1 and contacting module 4, respectively for connection of contacting module 4 and electronics module 5 are so designed that both electrical coupling paths 9, 10 are activated. In such case, a coupling path 9 couples the polarized segments 16+ with one another and a coupling path 10 the oppositely polarized segments 16− with one another. Present in the electrical coupling paths 9, 10 are capacitors 11a, 11b, 12a, 12b, which are so designed that they at least partially compensate the coupling capacitances arising in the lengthened electrical paths 8a, 8b. Especially, the coupling capacitances are at least, insofar, eliminated by the circuit that the vibronic measuring device exhibits an almost identical behavior in approximately equal applications in the case of all versions of the vibronic measuring device.

Preferably, the capacitors 11a, 11b, 12a, 12b are arranged in the electronics module 5. Since the electronics module 5 and the sensor module 1 should be identical in the case of all versions, the capacitors 11a, 11b, 12a, 12b must be so dimensioned that the resulting deviations in the behavior lie in a predetermined tolerance range. Of course, the capacitors 11a, 11b, 12a, 12b can also be individually matched to each variant of the contacting module 4. According to the invention, after a certain length of the contacting module 4, the center junction of one of the two coupling paths 9, 10 is no longer connected to ground. Either the two central electrical paths 8c are shortened or they are omitted. As a result, the two coupling paths 9, 10 are activated.

By this opposed coupling, the undesired coupling capacitances, which occur as a result of the contacting module 4 on the lengthened electrical paths 8a, 8b, can be compensated.

FIGS. 4a, 4b and 4c show different views of a short contacting module 4, which is applied in the case of all versions. Besides the electrical paths 8a, 8b, also the interfaces 17, 18 are shown in detail. FIG. 5 shows a longitudinal section through a contacting module 4, which is applied in the case of one of the lengthened versions of the measuring device.

Figure 6:
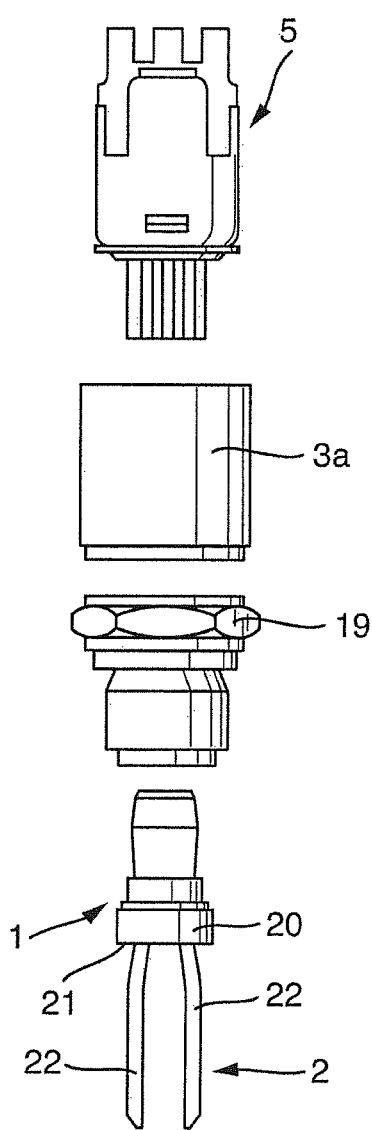
FIG. 6 is an exploded view of the vibronic measuring device in the compact version.
Figure 7:
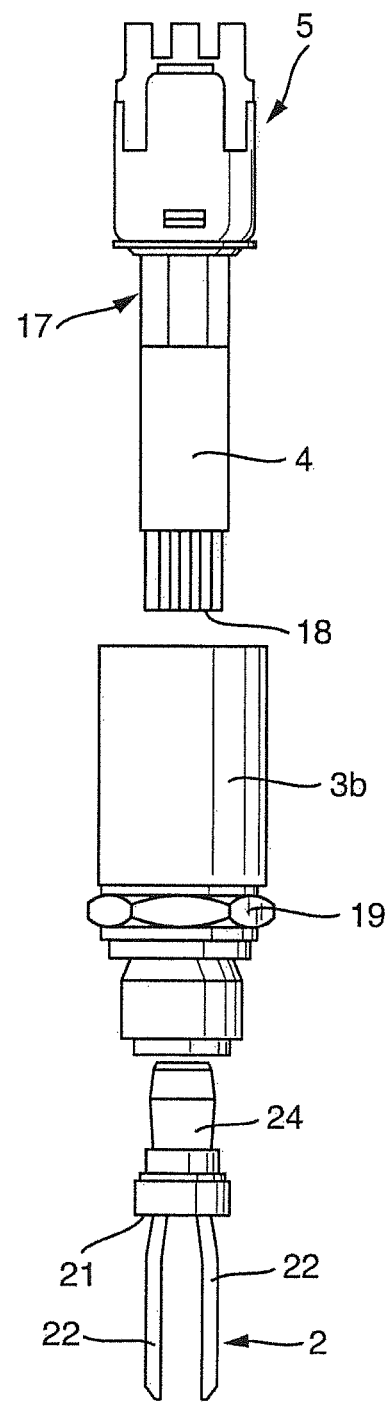
FIG. 7 is an exploded view of the vibronic measuring device in a lengthened version.

FIG. 6 shows an exploded view of an embodiment of a vibronic measuring device without contacting module. FIG. 7 shows an exploded view of an embodiment of a vibronic measuring device, in the case of which a contacting module 4 is used.

The modular system of the invention, as illustrated again in FIG. 8, has a number of advantages:

The pluggable modules 1, 4, 5 enable an easy construction in the final assembly.

A value creating production matched to the respective requirements can occur also in remote manufacturing plants.

By different geometrical embodiments of the individual interfaces 17, 18, an erroneous plugging together of the modules 1, 4, 5 is excluded In the case of the embodiment shown in FIG. 4a, the electrical contacts between the contact pins 14 and the contact sockets 15 are embodied as spring contacts. Especially, instead of contact sockets, guides 15, respectively plug-in sleeves, are used. The guides, respectively plug-in sleeves, 15 are so embodied that they assure a coarse positioning of the conducting electrical connections, respectively electrical paths 8a, 8b, however, the individual electrical spring contacts 14, 15 remain without additional mechanical loadings. The contact pins 14 can freely orient between the spring contacts 15. One speaks in this connection also of a floating seating of the contact elements 14, 15.

The spring contacts 15 yield a defined position. As a result of the rigid connecting lines 8a, 8b, no parasitic effects occur—such as can arise e.g. in the case of flexible connecting lines, depending on position.

Through suitable combination of a synthetic material, e.g. PEI, and metal, the contacting module 4 can be designed to be temperature resistant.

The contacting module 4 is additionally so designed that in the case of disassembly it can be pulled out as a single piece from the tubular housing of the vibronic measuring device. For this, especially the plugging force in the upper end region of the contacting module 4 is greater than the plugging force on the opposite end region of the contacting module 4.

FIG. 8 shows a preferred embodiment of the system of the invention. Shown on the right of FIG. 8 is the compact version of the vibronic measuring device, composed of sensor module 1 and electronics module 5. To the left of the compact version are different embodiments of the contacting module 4. Depending on whether a tubular extension 24 and/or a temperature reducing tube 3b, respectively a temperature reducing tube 3a, are/is used, a correspondingly dimensioned contacting module 4 is used. Depending on embodiment, the vibronic measuring devices are applicable in the case of different temperatures, e.g. at 100° C. or 150° C.

The length of the vibronic measuring device is determined by two independent factors: 1) the process temperature, wherein the short housing is designed for temperatures up to 100° C. and the long housing for temperatures up to 150° C., and 2) the position of the switching point with or without tubular extension 24. Correspondingly, there result four different lengths and correspondingly four differently dimensioned contacting modules 4.

Short housing up to 100° C. without tubular extension 24;
Long housing (thus with temperature reducing tube 3b) up to 150° C. without tubular extension 24;
Short housing up to 100° C. with tubular extension 24;
Long housing up to 150° C. with tubular extension 24.

The invention claimed is:

1. A system for determining and/or monitoring a process variable of a medium or for determining and/or monitoring a predetermined fill level of the medium in a container, comprising a sensor module with an oscillatable unit, which is arranged in such a manner in the container that said oscillatable unit extends to a defined immersion depth in the medium, or that said oscillatable unit is placed at the height of the predetermined fill level, a tubular extension; and/or a temperature reduction unit of a defined length, a contacting module;

an electronics module, composed of an exciter/receiving unit, which excites said oscillatable unit to execute oscillations and receives oscillations of said oscillatable unit, wherein two electrical coupling paths in which capacitors are placed are associated with said electronics module, said capacitors are so designed such that they at least partially compensate coupling capacitances arising in the electrical coupling paths, and said capacitors are arranged in said electronics module; and a control/evaluation unit, which based on at least one oscillation variable of the oscillations or based on a change of an oscillation variable of the oscillations, provides information concerning the process variable or the reaching of the predetermined fill level, wherein said sensor module and said electronics module are configured (a) to enable a direct electrical connection with one another, wherein a first of the two electrical coupling paths is activated and a second of the two electrical coupling paths is connected to ground and deactivated, and (b) to enable an indirect electrical connection therebetween via said contacting module and said tubular extension and/or said temperature reduction unit wherein said second electrical coupling path is no longer connected to ground and both electrical coupling paths are activated.

2. The system as claimed in claim 1, wherein:
at least four contact pins and at least four corresponding contact sockets are provided, in each case, for connection of said sensor module and said electronics module or for connection of said sensor module and said contacting module and said electronics module.

3. The system as claimed in claim 2, wherein:
six or more contact pins and contact sockets are provided in each case, at least two contact pins and contact sockets forming a ground path.

4. The system as claimed in claim 2, wherein:
in the case of the direct connection of said sensor module and said electronics module, said contact pins and said contact sockets of said sensor module and said electronics module are so designed that one of said two coupling paths is connected to ground and deactivated.

5. The system as claimed in claim 2, wherein:
in the case of application of the tubular extension and/or the temperature reduction unit with the contacting module, said contact pins and said contact sockets for connection of said sensor module and said contacting module, respectively for connection of said contacting module and said electronics module, are so designed that both said electrical coupling paths are activated.

6. The system as claimed in claim 2, wherein:
said contact sockets are embodied as spring contacts; and
said contact pins are rigidly embodied.

7. The system as claimed in claim 2, wherein:
said contacting module is manufactured of a synthetic material, which is temperature resistant at least up to a maximum temperature reigning at the location of use; and
said contact sockets, respectively the spring contacts, and the contact pins are manufactured of a temperature resistant, conductive metal.

8. The system as claimed in claim 1, wherein:
said sensor module, said contacting module and said electronics module are so designed that each of the modules is connectable with one another via plug connections.

9. The system as claimed in claim 8, wherein:
interfaces in the end regions of said contacting module are differently embodied.

10. The system as claimed in claim 2, wherein:
said interfaces are so embodied that the interface facing a freely accessible end region of said contacting module has a greater plugging force than the interface, which is provided on an opposing end region of said contacting module.

11. The system as claimed in claim 1, wherein:
said exciter/receiving unit is composed of a disc shaped piezoelectric element with four segments, and
the other two segments have a polarization (+) and two segments have an opposite polarization (−).

12. The system as claimed in claim 11, wherein:
the first electrical coupling path couples the polarized segments with one another and the second electrical coupling path couples the oppositely polarized segments with one another.

13. The system as claimed in claim 1, wherein:
said sensor module and said electronics module in the case of direct connection of said sensor module and said electronics module and in the case of insertion of said contacting module are embodied identically.

14. The system as claimed in claim 1, wherein:
said temperature reduction unit is provided between a process connection and said electronics unit.

15. The system as claimed in claim 14, wherein:
said tubular extension is provided between said sensor module and said process connection.

* * * * *